United States Patent [19]

Olex et al.

[11] Patent Number: 4,484,120
[45] Date of Patent: Nov. 20, 1984

[54] AUXILIARY FUNCTION COMMAND PRESEQUENCING FOR A ROBOT CONTROLLER

[75] Inventors: Michael B. Olex, Bay Village, Ohio; Rolf T. Spongh, Waterloo, Belgium

[73] Assignee: Nordson Corporation, Amherst, Ohio

[21] Appl. No.: 484,645

[22] Filed: Apr. 13, 1983

[51] Int. Cl.³ .............................................. G05B 19/42
[52] U.S. Cl. ..................................... 318/568; 364/140; 364/513; 901/43; 414/4
[58] Field of Search .................. 318/568, 565, 569; 364/140, 513, 184; 901/3, 23, 43; 250/222.1; 414/4, 5

[56] References Cited

U.S. PATENT DOCUMENTS

| | | | |
|---|---|---|---|
| 4,150,326 | 4/1979 | Engelberger et al. | 318/568 X |
| 4,187,454 | 2/1980 | Ito | 318/568 |
| 4,348,623 | 9/1982 | Kobayashi et al. | 318/568 |
| 4,403,281 | 9/1983 | Holmes et al. | 318/568 X |
| 4,453,221 | 6/1984 | Davis et al. | 318/568 X |

*Primary Examiner*—B. Dobeck
*Attorney, Agent, or Firm*—Wood, Herron & Evans

[57] ABSTRACT

A control system for a work robot having a number of articulated links including a controller for driving the links under closed loop servo control in response to a sequence of recorded link position commands read from a robot program memory. The sequence of link position commands is produced in a training session by an operator manually manipulating a robot simulator, or training arm, through a series of work-performing motions which are to be duplicated by the work robot. The sequence of link position commands produced by manual manipulation of the training arm during the training session is stored in the robot program memory. When the work robot is subsequently driven under closed loop servo control in response to the program stored in the robot memory, the controller also executes auxiliary functions, such as movement of a work piece operated upon by the work robot, in response to auxiliary function commands which are also stored in the robot program memory. In order to properly store the auxiliary function commands in the robot program memory, the auxiliary function commands are loaded in an auxiliary function memory prior to a training session so that they can be read out in a desired sequence.

32 Claims, 7 Drawing Figures

SEQUENCE SET-UP

SIMULATOR ROBOT
DATA CONVERSION

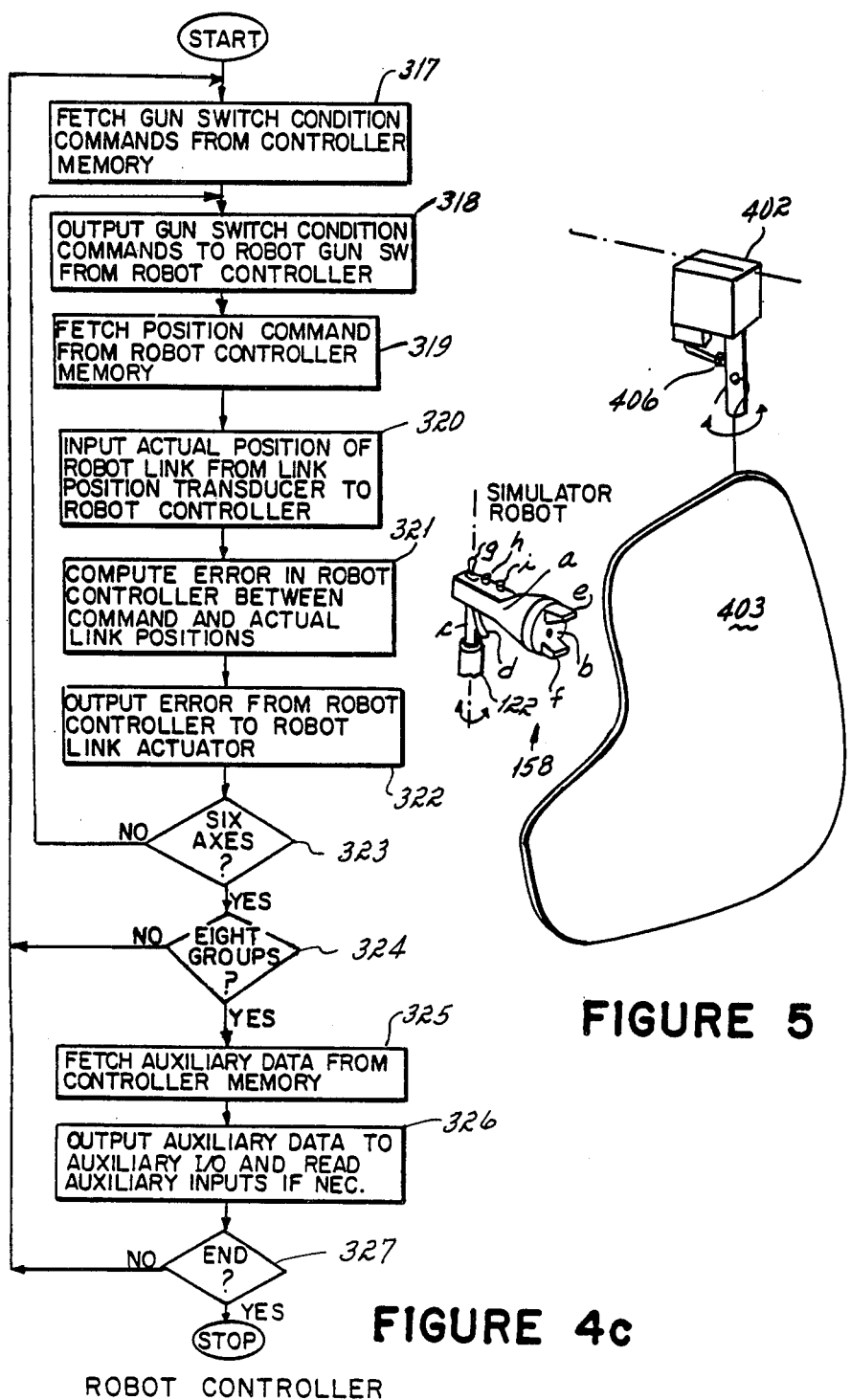

AUXILIARY FUNCTION COMMAND PRESEQUENCING FOR A ROBOT CONTROLLER

DESCRIPTION OF THE INVENTION

This invention relates generally to a control system for a work robot including a controller for concurrently driving at least one articulated robot link under closed loop servo control and executing at least one auxiliary function operating in conjunction with the robot link in response to a stored sequence of recorded link position commands and auxiliary function commands. The invention is disclosed particularly in relation to a work robot for spray painting a work piece in which the control system serves to move and operate a paint spray gun on an articulated robot arm and to control auxiliary functions, not related to the control of the gun or the arm, such as rotation of the work piece during the spray painting operation or the activation of an exhaust fan in the painting area.

A work-performing robot, or manipulator, typically includes a plurality of links interconnected to provide relative motion with a plurality of degrees of freedom. The links are each provided with a signal-controlled actuator for powering the respective links, as well as a position transducer for providing a real-time signal correlated to the actual position of the robot link. In order to provide the actuator control signals, a sequence of command positions for each link is stored in a suitable memory device and the command positions are periodically retrieved and compared against the actual link position signals provided by the link position transducers. In response to the comparisons, link positional error signals are generated for each of the links and then input to the various link actuators. Therefore, closed loop servo techniques are utilized to drive the various link actuators to move the links to the desired command positions.

There are many applications for work robots such as welding and the application of various coating materials. As an illustrative example, a work-performing robot may be used for spray painting specific articles of differing shapes. A program comprising sequences of command positions for the robot links is then produced to effect the movement of the robot for the spraying of paint onto such articles, such program taking into account the specific dimensions and paint requirements of the particular article.

A paint spraying robot typically includes a spray painting gun at the outboard end of the outermost link of a multi-link articulated arm. The gun is controlled to spray paint an article, or work piece, located at a work station as the robot executes a prerecorded sequence of robot link position commands. In order to control the application of paint by the gun, the spray gun includes a number of devices such as an electrode for electrostatically charging the sprayed paint, a paint flow control valve, and fan outlets for applying pressurized air to the paint sprayed from the gun.

An electrostatic switch is controlled by programmed commands to selectively apply an electrostatic potential to the electrode, and hence to the paint sprayed by the gun. An OFF/ON/FAN switch is likewise controlled by programmed commands to regulate the spraying of paint from the gun. The gun is responsive to an OFF command to close the paint flow control valve and to an ON command to open the paint flow control valve to supply paint in a first pattern. In response to a FAN command, the flow control valve is opened and two streams of pressurized air from the fan outlets are applied to the paint as it is sprayed from the gun to shape the sprayed paint into a second pattern. The commands to control the flow of paint from the gun and the commands to control the application of electrostatic charge to the sprayed paint shall be referred to herein collectively as "gun commands".

In order to control the movement of the work robot, a sequence of command positions for each robot link is stored in a robot program memory. The sequences of command positions for the robot links, taken as a whole, constitute a complete program for a particular movement sequence to be performed by the robot. The gun commands are also stored in the robot program memory, in proper timed relationship to the link position commands, to be sequentially retrieved from the robot program memory and output to the spray gun to control the electrostatic charging device and the paint spray devices. Since both the link position commands and the gun commands are processed concurrently, the emission of spray paint is coordinated with the movement of the gun relative to the work piece.

Production of the prerecorded motion and gun command sequence, known as robot "training" or "teaching", can be accomplished in several ways. In one approach, a lightweight "training robot", or simulator, is used which, except for the reduced mass of the training robot and the absence of actuators for the links, is identical in all respects to the considerably more massive work robot which is being programmed. To program the work robot, the output element of the simulator, the spray gun, is grasped manually by the operator doing the programming and moved through a sequence of motions which it is desired to have the work robot subsequently execute. Since the training robot is lightweight, it can be moved manually by the operator with little difficulty. As the simulator robot is moved through the desired sequence of motions, position transducers at the joints of its links produce electrical link position signals which are recorded for subsequent servo loop control of the work robot. Simultaneously with the simulator movement, the gun switches (electrostatic and/or OFF/ON/FAN) are manually operated to control the emission of the spray paint from the gun. The conditions of the gun switches are recorded in synchronism with the recording of the link position transducer outputs for subsequent replay by the gun devices and the work robot, respectively. When the robot program is thereafter replayed, the recorded sequence of gun commands is output to the spray gun in synchronism with the sequence of robot position commands, thereby coordinating spray coating emission with the spray gun position.

In another method of robot programming, the actuators of the work robot are bypassed or decoupled and the work robot is counterbalanced so that the operator may more easily move the work robot through a desired path during training. The robot link position transducer outputs are recorded during this manual programming phase, as are the gun command signals, so that they can be subsequently replayed for execution by the robot and the gun, respectively.

Another approach to training a work robot involves providing the work robot with motion or force-sensing transducers. When an operator attempts to move the work robot during manual programming, the force or motion sensors detect the force or motion applied by the operator to the robot. The force or motion sensor outputs are input to the actuators for moving the individual work robot links in accordance with the manual force or motion applied thereto by the operator. As the robot links move under power assistance, the link position transducer outputs are recorded, along with the gun condition signals, for subsequent replay and execution by the robot and the gun, respectively.

During a robot training or teaching session, such as when using a robot simulator, the operator of the simulator manually controls the movement of the simulator and the operation of the gun switches. The simulator motion and the gun switch conditions are recorded to form the program for the work robot. Typically, the paint spraying simulation executed by the operator is the actual spray painting of a work piece under the same conditions as will be encountered by the work robot. Therefore, the operator not only moves the gun, but also operates the gun switches to control both the spraying of paint in a particular pattern upon a work piece and the application of electrostatic charge to the paint spray. During the training session, the operator applies paint to the work piece in a manner to obtain an observably satisfactory coating of paint on the work piece.

During a training session, the operator manipulates the simulator robot and the gun to spray paint a work piece at a work site such as in a paint spray booth or along a work piece conveyor line. The link position commands and the gun commands from the simulator are coupled from the simulator and the gun through cables to a robot controller console located some distance from the work site. During a training session, a second operator at the controller console verbally communicates with the simulator operator and starts and stops the recording of the paint spray program produced by the simulator. The second operator typically interfaces with the controller through a keyboard and display terminal to properly record the link position commands and gun commands in the robot program memory of the controller.

During a training session, while the simulator operator moves the gun, and controls the gun switches, often there are other functions which must be performed in regard to the gun, the work piece or the environment in order to produce a complete spray painting program. For example, in the course of painting a work piece, it may be necessary to change the color of the paint being applied. To do this, a command must be issued to the paint source to effect the change in the color of paint which is supplied to the spray gun.

As another example, if it is necessary to paint two sides of a work piece, a command may be issued to a servo motor for a work piece holder to turn the work piece so that the second side of the work piece is accessible to the operator of the simulator. If the work site is an enclosed paint spray booth, it may be necessary to issue a command to activate an exhaust fan at the beginning of a spray painting operation and another command to deactivate the fan at the end.

During a training session, the commands for these functions are produced by the second operator at the controller console. These commands are both executed during the training session, so that a proper program can be prepared by the simulator operator, and recorded with the link position commands and the gun commands, in proper timed relationship thereto, to produce a complete spray painting program for the work robot.

As an example of the implementation of such functions during a training session, if the work piece is a relatively flat panel having two sides which are to be painted, a command must be produced to effect turning the panel during the training session. In addition, a command must also be recorded, at the proper time, in the program stored in the robot program memory so that the panel will be turned at the proper time during subsequent execution of the program by the work robot. In order to produce the proper command during training, typically the operator of the simulator robot verbally communicates with the second operator at the console at the time that the simulator operator has completed painting one side of the panel and wishes the panel turned to provide access to the other side of the panel.

The second operator at the console responds to the verbal request by the simulator operator by depressing the appropriate key or combination of keys on the console keyboard to produce a command to turn the work piece. This command is coupled to, for example, a servo motor to rotate the work piece 180°, and the command is also recorded with the sequence of link position commands at a point in the sequence correlated with the point in the link command sequence at which the "turn part" command is issued at the console.

The above-described commands, related to auxiliary functions such as turning the work piece or activating an exhaust fan, shall be referred to herein as "auxiliary function commands", or "auxiliary commands". In the past, the implementation of such auxiliary commands during a training session has required a second operator, in addition to the operator of the simulator robot, at the controller console, at a location remote from the robot work site. The need for an additional operator in producing a paint spray program is, of course, costly, and it would be desirable for a single operator to be able to create an entire paint spray program during a training session.

It would appear that the only way to accomplish this would be to move a keyboard or control panel to the work site in order to make it accessible to the simulator operator. In this way, the operator of the simulator would be able to key in the desired auxiliary commands in the course of moving the spray gun and operating the gun controls during a training session.

However, if a separate auxiliary control panel is provided, the simulator operator must divide his attention between manipulating the spray gun to properly paint the work piece and selecting appropriate buttons or keys to produce a desired auxiliary function command. If the auxiliary function keys are placed upon the spray gun in some fashion, a large number of auxiliary command signal cables from the keys to the robot controller are required, making movement of the gun difficult. Whatever the location of such an auxiliary keyboard, there would be a large array of auxiliary function keys, such as ten or twenty, and the burden of selecting the proper key for the desired auxiliary function at the proper time would prohibit the similator operator from concentrating on proper manipulation of the spray gun and the simulator robot.

It is the general aim of the invention, therefore, to provide a work robot control system, such as a system for the control of a robot of the foregoing paint spray type, in which a sequence of interleaved link position commands, gun commands, and auxiliary function commands are produced for the work robot by a single operator.

This objective has been accomplished in accordance with certain principles of the invention by providing a control system for a work robot which includes an auxiliary function memory which is loaded, prior to a training session, with auxiliary function commands so that they can be read from the auxiliary function memory during the training session in the sequence in which they are needed. In the illustrated form of the invention, two switches, in addition to the normal gun switches, are provided on the simulator robot spray gun: a programming start/stop pushbutton switch and an auxiliary function sequencing pushbutton switch. In order to start a training session, to begin the storage of link position commands, gun commands, and auxiliary function commands in the controller robot program memory, the simulator operator depresses the start/stop programming switch on the gun. At the completion of recording of a program, the simulator operator depresses the start/stop programming pushbutton switch again to end the training session and conclude the recording of commands in the robot program memory.

During the training session, whenever an auxiliary function must be executed and recorded, the simulator operator depresses the sequencing pushbutton, and the controller reads the next auxiliary function command, in sequence, from the auxiliary function memory. The auxiliary function is executed during the training session, and the auxiliary function command is also stored in the robot program memory together with the link position commands and the gun commands at a point in the sequence of link position commands correlated to the point in the sequence at which the sequencing pushbutton is depressed by the simulator operator. In this way, during a training session, the simulator operator has only one additional control to consider, and the need for a second operator at the control console during a training session is eliminated.

Other objects and advantages of the invention, and the manner of their implementation, will become apparent upon reading the following detailed description and upon reference to the drawings, in which:

FIG. 4a, 4b and 4c are a flow charts of illustrative form of robot system embodying the present invention; and FIG. 5 is a perspective view, in schematic form, of a paint spray gun at the end of the simulator robot arm of FIG. 2, together with a part to be sprayed and an auxiliary device for turning the part.

Figure 1:
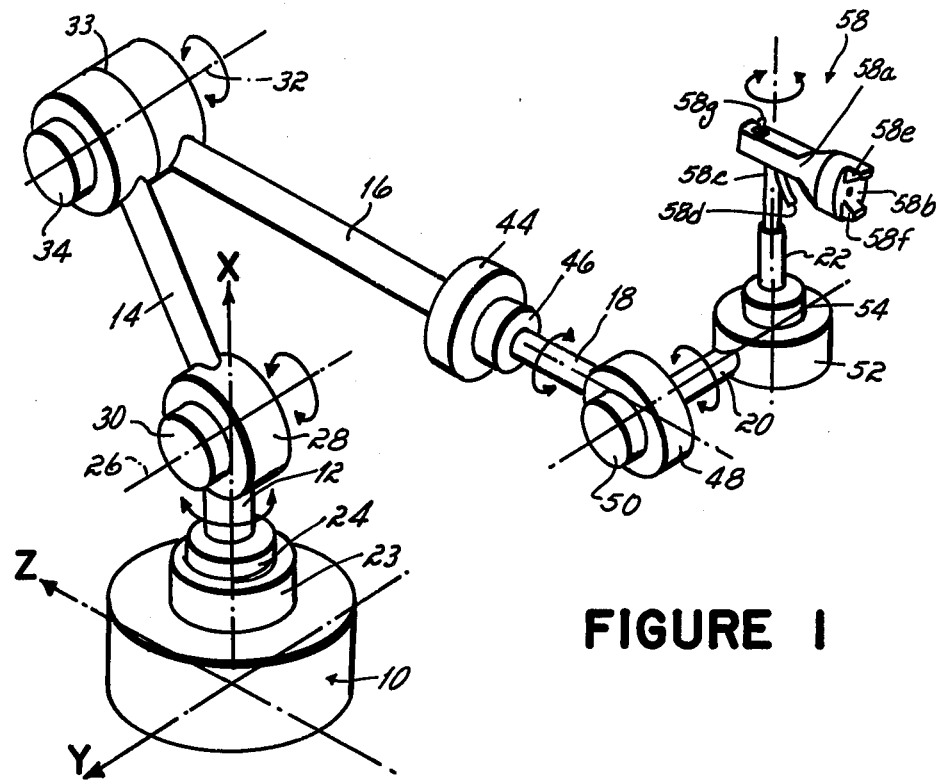
FIG. 1 is a perspective view, in schematic form, of a typical work-performing robot, or manipulator, showing the general relationship of the relatively massive robot links and their respectively associated actuators and position transducers.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention as defined by the appended claims.

The invention shall be described herein with relation to a control system for storing a sequence of link position commands, gun commands, and auxiliary function commands for a work-performing robot for spray painting a work piece. With reference to FIG. 1, a typical work-performing robot, or manipulator, includes a base 10 which rests on the floor or upon a movable table (not shown) which may be indexed to a number of positions. Extending from the base 10 are plural, series-connected, elongated, articulated members or links 12, 14, 16, 18, 20 and 22 which, in the preferred embodiment, provide the robot with several, in this instance six, degrees of freedom. In practice, the links 12, 14, 16, 18, 20 and 22 collectively constitute a relatively large mass. For example, the links 12, 14, and 16 are each approximately 1–4 feet in length, and typically weigh in the range of 10–400 pounds each. The links 18, 20 and 22 which, in the work-performing robot shown in FIG. 1 constitute a wrist, typically are significantly less massive than the links 12, 14 and 16, although this is not necessarily the case.

The link 12 is vertically disposed and mounted to the base 10 by a suitable joint which permits the link to rotate about its longitudinal axis, which is coincident with the X axis. An actuator 23 is associated with the link 12, and is responsive to a position error signal provided by a conventional robot controller (not shown in FIG. 1) to facilitate selective, bidirectional angular motion of the link 12 in an azimuthal direction about its longitudinal axis to the desired link position. Also associated with the link 12 is a position transducer, or resolver, 24 which provides an electrical signal correlated to the actual angular, or azimuthal, position of the link 12 relative to the base 10.

The link 14 at its lower end is connected to the upper end of the link 12 by a suitable joint for permitting pivotal, elevational movement of the link 14 in a vertical plane about a horizontal axis 26 which is perpendicular to the X axis and parallel to the Y-Z plane. Associated with the link 14 is an actuator 28 which is responsive to a position error signal from the robot controller and facilitates selective, bidirectional, elevational, pivotal movement of the link 14 about horizontal axis 26 to the desired link position. Also associated with the link 14 is a position transducer 30 which provides an electrical signal correlated to the actual elevational position of the link 14 relative to the link 12.

In like manner, the links 16, 18, 20 and 22 are interconnected by suitable joints and have associated actuators 33, 44, 48 and 52, respectively. Each of the link actuators is responsive to a position error signal from the robot controller to facilitate movement of each of the links to the desired link position. Also associated with each of the links 16, 18, 20 and 22 is a position transducer 34, 46, 50 and 54, respectively. Each of these position transducers provides an electrical signal correlated to the actual position of its associated link. The articulated links 18, 20 and 22 collectively constitute a wrist.

The link 22 constitutes the mechanical output element of the work-performing robot. While the mechanical output of the robot can be utilized for positioning a wide variety of devices, in the illustrated form of the invention the work-performing robot is utilized to position a spray coating gun 58 having a barrel 58a with a nozzle 58b which emits coating particles. The gun handle 58c is mounted to the upper end of the wrist link 22. The gun handle 58c mounts a suitable trigger mechanism 58d which, when actuated by a suitable signal-operated device (not shown), functions to operate a valve to control the emission of coating particles from the nozzle 58b of the spray gun 58. The nozzle 58b is positioned between a pair of spray fan air outlets 58e, 58f coupled to a source of pressurized air (not shown) for shaping the pattern of the spray emanating from the nozzle 58b. The trigger mechanism 58d is a three position trigger. The three trigger positions are "off", "on" (paint being discharged by the gun with a first spray fan pattern activated), and "on/fan" (paint being discharged by the gun with a second spray fan pattern activated). The spray gun 58 further includes an electrode (not shown) for electrostatically charging the paint sprayed by the gun 58 which is coupled from a source of electrostatic voltage (not shown) under the control of an electrostatic switch, illustrated as a toggle switch 58g.

The longitudinal rotational axes of the wrist links 18, 20 and 22 are mutually perpendicular, and accordingly constitute three degrees of freedom for the robot. These three degrees of freedom, coupled with the three degrees of freedom of the links 12, 14 and 16, provide a total of six degrees of freedom for the work-performing robot.

In the operation of the work-performing robot shown in FIG. 1, a series of programmed, i.e., desired, link position command signals stored in a suitable robot program memory device of the robot controller are periodically retrieved and compared against the actual link position signals provided by the link position transducers 24, 30, 34, 46, 50 and 54, and in response thereto link positional error signals are generated for each of the links 12, 14, 16, 18, 20 and 22. The positional error signals for the various links 12, 14, 16, 18, 20 and 22 are then input to the various link actuators, 23, 28, 33, 44, 48 and 52, which typically are of the servo-controlled electrohydraulic type, for moving the links to the desired, or programmed, command positions which in turn reduce the positional error signals to zero. Thus, the links of the work-performing robot of FIG. 1 are driven through the programmed sequence of desired motions, or command positions, utilizing closed-loop servo techniques, by periodically comparing desired position command signals retrieved from the memory of the robot controller with actual link position signals from their associated position transducers, and using the resulting positional error signals associated with the different links to drive the various link actuators to the desired, or programmed, command positions.

During the operation of the work-performing robot gun commands, interleaved at proper points in the sequence of link position commands, are coupled to the electrostatic and spray trigger controls of the gun 58. In response to these gun commands, the paint flow, air and electrostatic charging mechanism at the gun are operated in relation to the gun position established by the link position commands.

Since a robot controller, actuators, position transducers, closed-loop servo controls, and the like for the work-performing robot of FIG. 1 are well known and form no part of this invention, they are not further discussed in detail herein, except to the extent necessary to an understanding of the flow charts of FIG. 4.

Figure 2:
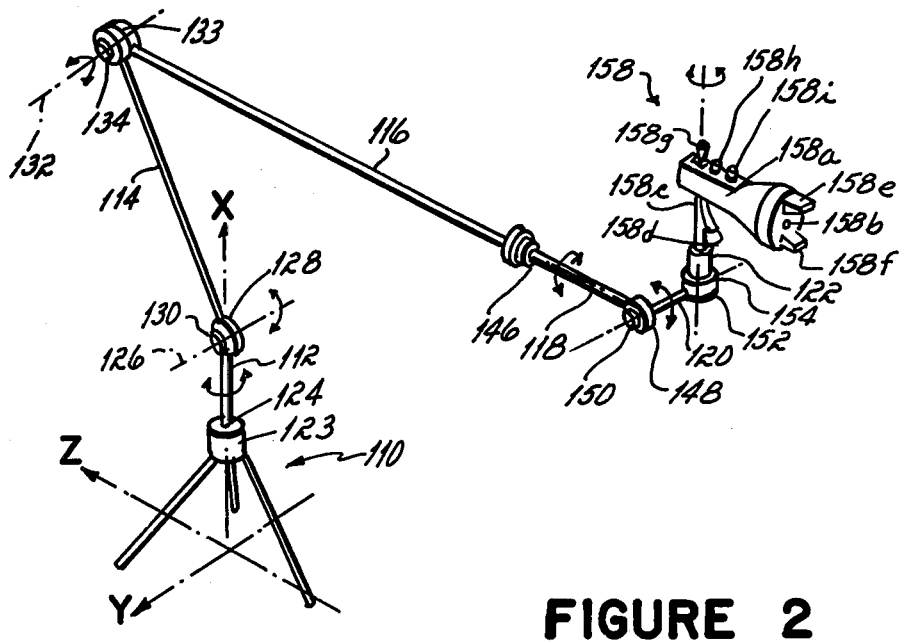
FIG. 2 is a perspective view, in schematic form, of a lightweight, hand-manipulable simulator robot, or training arm, showing the general relationship of the simulator links and associated position transducers.

The robot simulator, or training arm, shown in FIG. 2, which is useful in preparing a programmed sequence of motions for input to the work robot for execution thereby relative to a workpiece, includes a tripod base 110 from which extends vertically a link 112 which is connected to the base for rotational movement about a vertical axis by a rotary joint 123. A position transducer 124 associated with the link 112 and base 110 provides an electrical signal correlated to the actual angular position of the link 112 relative to the stationary base. Pivotally connected to the upper end of the link 112 by a rotary joint 128 is a link 114 which pivots about axis 126. An angular position transducer 130 associated with the joint 128 and the link 114 provides an electrical signal correlated to the actual angular position of the link 114 with respect to the link 112. A link 116 connects to the link 114 via a rotary joint 133 for pivotal movement about axis 132. An angular position transducer 134 associated with the joint 133 and the link 116 provides an electrical signal correlated to the actual angular position of the link 116 with respect to the link 114.

Also included in the robot simulator depicted in FIG. 2 are links 118, 120 and 122 which are pivotally connected to links 116, 118 and 120, respectively, via rotary joints 144, 148 and 152, respectively. Angular position transducers 146, 150 and 154 associated with the rotary joints 144, 148 and 152, respectively, and the links 118, 120 and 122, respectively, provide electrical signals correlated to the actual angular position of the links 118, 120 and 122 with respect to the links 116, 118 and 120, respectively.

The length of the links 112, 114, 116, 118, 120 and 122 of the simulator robot of FIG. 2 are identical to the lengths of the links 12, 14, 16, 18, 20 and 22, respectively, of the work-performing robot shown in FIG. 1. Of course, the mass of the links 112, 114, 116, 118, 120 and 122 of the simulator robot of FIG. 2 are a mere fraction of that of their counterpart links 12, 14, 16, 18, 20 and 22 of the considerably more massive work-performing robot shown in FIG. 1. Similarly, the joints 123, 128, 133, 144, 148 and 152 of the simulator robot permit the same type of pivotal motion between their respectively associated links 112, 114, 116, 118, 120 and 122 as their counterpart rotary actuators 23, 28, 33, 44, 48 and 52 provide for their respectively associated links 12, 14, 16, 18, 20 and 22 of the work-performing robot.

The articulated links 118, 120 and 122 collectively constitute a wrist, and the link 122 constitutes the mechanical output element of the simulator robot. In correspondence with the work robot of FIG. 1, the mechanical output of the simulator comprises a spray coating gun 158 having a barrel 158a with a nozzle 158b which emits coating particles. The gun handle 158c is mounted to the upper end of the wrist link 122. The gun handle 158c mounts a suitable trigger mechanism 158d which, when actuated by the operator of the simulator, functions to control the emission of coating particles from the nozzle 158b of the spray gun 158. The nozzle 158b is positioned between a pair of spray fan air outlets 158e, 158f coupled to a source of pressurized air (not shown) for shaping the pattern of the spray emanating from the nozzle 158b. The trigger mechanism 158d is a three-position trigger. The three trigger positions correspond to those for the work robot trigger 58d and are "off", "on/fan", and "on". The spray gun 158 further includes an electrode (not shown), for electrostatically charging the paint sprayed by the gun 158, which is coupled from a source of electrostatic voltage (not shown) under the control of a switch illustrated as a toggle switch 158g.

When the spray gun 158 is moved manually, by an operator grasping the handle 158c thereof, through a sequence of motions necessary to spray coat an object, which is possible due to the lightweight construction of the simulator, the various links 112, 114, 116, 118, 120 and 122 of the simulator robot move through a sequence of motions. Simultaneously, the transducers 124, 130, 134, 146, 150 and 154 of the simulator robot associated with the various simulator robot links 112, 114, 116, 118, 120 and 122 provide electrical outputs corresponding to the actual sequence of positions, or motions, through which the simulator robot links move in the course of manually moving the gun through the positions necessary to coat the object. These transducer signals corresponding to the actual positions of the different simulator robot links can be input directly to the robot controller or recorded by any suitable means (not shown).

The spray gun 158 on the simulator contains the same elements and controls 158a–158g as the corresponding elements 58a–58g of the gun 58 utilized by the work robot. In the course of moving the gun 158 through the sequence of motions necessary to spray paint a work piece, the operator of the simulator periodically manually actuates the trigger 158d to permit paint to be discharged from the gun nozzle 158b. Depending upon the position of the trigger, the compressed air from the spray fan outlets 158e, 158f may also be provided to shape the spray pattern from the nozzle. The simulator operator also activates the electrostatic switch 158g to apply electrostatic charge to the sprayed paint.

By recording signals corresponding to the position of the switch 158d in conjunction with recording the position signals provided by the actual position transducers 124, 130, 134, 146, 150 and 154 of the simulator robot for the entire sequence of motions of the simulator robot links 112, 114, 116, 118, 120 and 122 produced by manual manipulation by the operator of the gun 158, a sequence of coordinated gun switch command signals and desired robot link position signals can be stored. In like manner, the operator can utilize the electrostatic charging feature of the spray gun, by activating the toggle switch 158g during a training session for a spray coating operation. Signals indicative of the position of the toggle switch 158g are coordinated with the robot link position commands and stored.

These stored signals (link position commands interleaved with gun commands) are maintained within the robot controller, as a painting program, in a mass memory device such as a bubble memory. Thereafter, when it is desired to operate the work robot under the control of the stored program, the recorded link position commands input to the robot controller for use by the work-performing robot are sequentially retrieved and compared with signals correlated to the actual work robot link positions; and link position error signals are derived for input to the work robot link actuators to cause the work robot links to reproduce the motion of the simulator robot links in the manner previously described. In addition, gun commands interleaved with the link position commands are retrieved, and the gun switches are activated in the appropriate timed relationship to the motion of the robot links to effect spray painting of the work piece.

Associated with the simulator robot and work robot of an illustrative robot system with which this invention is useful is a robot controller 200, which preferably comprises a microprocessor-based control circuit. The robot controller 200 includes a mass memory device, such as a bubble memory, serving as a robot program memory for storing a programmed sequence of desired or command positions for driving the various work robot links 12, 14, 16, 18, 20 and 22, as well as suitable buffer memory for temporarily storing the actual and desired positions of the work robot links and the computed positional errors therebetween which result when the work robot is input with, that is, driven by, the programmed sequence of desired positions stored in the robot controller memory. Also included in the robot controller 200 are computing means for comparing desired work robot link positions with actual work robot link positions temporarily stored in the buffer memory and deriving in response thereto work robot link position error signals for input to the link actuators 23, 28, 33, 44, 48 and 52 of the work robot. During program generation, teaching or training, signals correlated to the desired work robot link positions 200 from simulator robot transducers 124, 130, 134, 146, 150 and 154 are input to the robot controller on lines 202 via a resolver-to-digital converter 203 connected via lines 204 to the simulator robot position transducers. During program execution, or playback, signals correlated to the actual work robot link positions from work robot position transducers 24, 30, 34, 46, 50 and 54 are input to the robot controller on lines 205 via a resolver-to-digital converter 206 connected via lines 207 to the work robot position transducers, while the work robot link position error signals computed by the robot controller are output to the respective link actuators 23, 28, 33, 44, 48 and 52 of the work robot on lines 208 via a digital-to-analog converter 209 which receives the link position error signals on output lines 210.

The robot controller mass memory also stores gun commands interleaved with the sequence of link position commands. The gun commands include commands for effecting the desired condition of the OFF/ON/FAN switch 58d of the work robot. These OFF/ON/FAN switch condition signals are input during program generation to the robot controller memory on line 211, and are output during program execution to the memory to the OFF/ON/FAN switch 58d of the work robot on line 212. Likewise, gun commands for the electrostatic switch are input during program generation to the robot controller memory on line 221, and are output during program execution from the memory to the electrostatic switch 58g of the work robot on line 222.

In a given robot system, both during program recording or training with the simulator robot and during program execution or replay by the work robot, the controller 200 processes position command signals at a specific rate, which may be constant or vary with time. The rate may be the same or different during program recording and program execution. For example, assuming during program execution that there is no interpolation by the controller 200 and no relative movement between the object being coated by the robot and the work station whereat the robot is located, the controller position command signal processing rate will be the same during both program recording and program execution. Thus, if there are six robot axes, during program recording the robot controller will sample and store in memory for each simulator robot axis N simulator robot link position transducer signals (desired positions) per second. Similarly, during program execution the controller will, N times per second for each axis, fetch from memory a position command (desired position) to be used to drive the link actuator for that axis. In a typical situation, N is 16, although other controller processing rates can be used if desired.

If interpolation is employed by the controller 200 during program execution to compute additional position commands between a pair of sequential position commands stored in memory, the number of position commands per axis per second issued to the work robot will be greater than the number of position signals from the simulator robot sampled and recorded by the controller per second per axis.

If there is relative motion between the object being painted and the robot work station during program recording and program execution, the position command processing rate of the controller 200 may vary with time if the speed of the conveyor transporting the article being coated is varying with time and it is used to control the rate at which the controller fetches position commands (desired position) from memory. Sampling of the work robot actual link positions and computations therefrom of position error signals, which are output to the link actuators of the work robot, are accomplished at a desired set rate. This rate is independent of the rate at which the controller fetches position commands from memory.

For convenience, during program execution, the rate per axis at which the controller 200 fetches commands from memory is referred to herein as the controller "command position processing rate". The rate during program recording at which the controller 200 samples and stores in memory the OFF/ON/FAN signals output from the simulator robot switch 158d and the electrostatic signals from the switch 158g, and the rate at which the controller during program execution fetches from memory the stored OFF/ON/FAN signals and electrostatic signals, may be equal to one another as well as to the command position processing rate.

The robot controller mass memory further stores commands related to auxiliary functions to be performed in the execution of a painting program in conjunction with the movement of the work robot links and the operation of the spray gun switches. These auxiliary functions are implemented by a number of auxiliary output devices 401 and an exemplary auxiliary output device, a servo motor 402 to turn the work piece being painted. The auxiliary functions further include a number of auxiliary inputs from input devices 404 and an exemplary auxiliary input, from a limit switch 406 indicative of completion of the turning of the work piece. Auxiliary function commands associated with auxiliary outputs are coupled during program execution from the robot program memory to the auxiliary output devices 401, 402. Auxiliary function commands associated with auxiliary inputs direct the controller to read the condition of the auxiliary input devices 404, 406 during program execution.

Other auxiliary output devices 401 may include, for example, a motor for indexing a movable robot table, a color change mechanism for changing the color of the paint applied by the spray gun 58, or a control for the activation of an exhaust fan for a spray painting booth. Other auxiliary inputs 404 may include, for example, a limit switch for indicating that a movable robot table has reached a desired position or a sensor producing a signal indicating the presence of a particular physical characteristic in the shape of the work piece.

In accordance with the invention, auxiliary function commands are supplied during a training session for execution and for storage in the robot program memory from an auxiliary function memory 407. Prior to the training session, auxiliary function commands are written into the auxiliary function memory from the controller 200 on a line 410. During the training session, the auxiliary function commands are read from the auxiliary function memory 407 on a line 405.

As shall be described in more detail hereinafter, the auxiliary memory 407 is loaded with a sequence of auxiliary commands so that the commands can be read from the auxiliary memory in the order in which they are to be executed during the training session. Then, when the operator of the simulator robot manipulates the simulator to produce a sequence of link position commands, and activates the gun switches 158d and 158g to produce the gun commands, the operator also activates a switch to direct the controller to read the auxiliary function commands, in sequence, at desired times during the training session, from the auxiliary memory.

In order to do this, the operator of the simulator robot depresses a sequence pushbutton switch 158i on the gun, which is coupled to the robot controller by a line 214, and the robot controller is responsive to the switch 158i to read the next auxiliary function command, in sequence, from the auxiliary memory 407. Each time the simulator operator activates the sequence switch 158i, the next auxiliary function command in the auxiliary memory is read, executed and stored in the robot program memory by the controller 200. The point in the sequence of link position commands in the program memory at which the auxiliary function command is stored is correlated to the point in the sequence of link position commands at which the simulator operator depresses the sequence pushbutton 158i.

Prior to a training session for recording a spray painting program, the auxiliary memory 407 is loaded with the necessary auxiliary function commands by the operator of the simulator. This is accomplished by utilizing the robot controller computer, keyboard and display. The auxiliary function commands are loaded into the auxiliary memory 407 in such a manner that they are read from the auxiliary memory in the sequence in which they are to be executed during a training session. Normally, this permits loading the commands into the auxiliary memory in the order in which the commands are to be read out of the memory, although this is not necessarily the case.

In order to permit the simulator operator to begin and end a training session, a second pushbutton switch, a program switch 158h, on the gun 158 is coupled to the robot controller on a line 213. When the simulator operator wishes to begin a training session, initiating the recording of link position commands, gun commands and auxiliary function commands, the operator depresses the program switch 158h, and the robot controller begins storing the commands in the robot program memory. When the simulator operator has completed programming, and wishes to end the training session and the recording of commands, the operator depresses the pushbutton program switch 158h, and the robot controller stops storing commands in the robot program memory, ending the training session. Since the program switch 158h is provided at the spray gun 158, the simulator operator can begin and end a training session while operating the simulator at the work site.

Figure 4A:
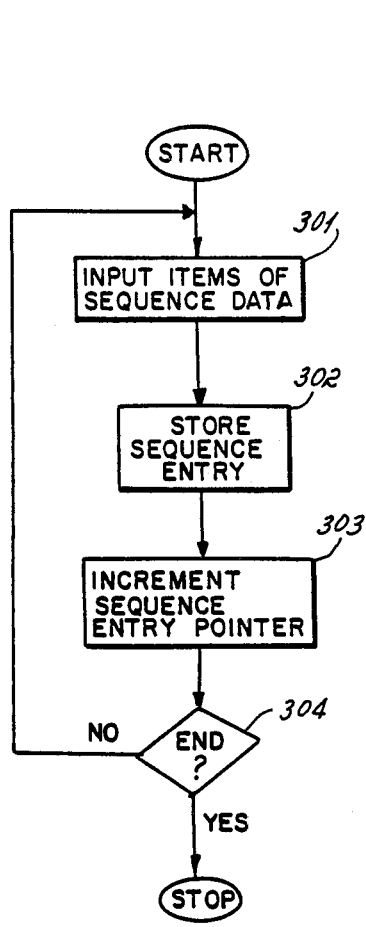

FIG. 4a is an illustrative flow chart of the routine followed by the robot controller computer in loading the auxiliary memory 407. With reference to FIG. 4a the procedure for loading the auxiliary memory 407 calls for inputting items of sequence data (each of the auxiliary function commands) through the controller keyboard (301) and the storage of each entry in the auxiliary memory (302). After each auxiliary function command is stored, a sequence entry pointer is incremented (303) so that the next auxiliary function command is stored in the next memory location. Any convenient prompting scheme utilizing the display of the robot controller 200 may be utilized to assist the operator in entering the sequence of auxiliary function commands. After the last command is entered, the sequence set-up routine ends (304). The auxiliary memory 407 is then loaded so that the robot controller can read the auxiliary function commands, in the sequence they are to be executed, from the auxiliary memory during the operation of the simulator robot in a training session.

The particular format for the entry of the auxiliary function commands is not critical to the invention. In one form of auxiliary memory and controller, one or more of three types of auxiliary function commands can be stored in the auxiliary memory at each of eight sequential storage locations. In that way, at each of the eight storage locations, auxiliary function commands are stored which may be characterized as auxiliary outputs, auxiliary inputs, or delays. The auxiliary function commands at each of the storage locations, one through eight, are read by the robot controller as each memory location of the auxiliary memory is sequentially addressed by successive actuations of the pushbutton sequencing switch 158$i$.

After all necessary auxiliary commands have been stored in the auxiliary function memory, a painting program may be prepared by the simulator operator without the need for assistance from an additional operator. In order to record a programmed sequence of motions with respect to a workpiece for subsequent execution or replay by the work robot, the workpiece is first located at the site of the simulator robot. The operator of the simulator robot, having previously loaded the auxiliary memory 407, is now able to perform the complete programming operation at the location of the simulator robot. The operator first depresses the program switch 158$h$ on the gun, and the robot controller 200 begins storing a program for subsequent control of the work robot and auxiliary functions.

After depressing the program switch 158$h$, the operator manipulates the simulator robot through the desired sequence of motions with respect to the workpiece. While the operator is manipulating the simulator robot, the outputs of the link position transducers 124, 130, 134, 146, 150 and 154 of the respective simulator robot links are input to the controller 200 via the R/D converter 203 where they are sampled, buffered and recorded in memory (305). Additionally, the condition of the robot simulator OFF/ON/FAN switch 158$d$ and the condition of the electrostatic switch 158$g$ are input to the controller 200 on the lines 211, 221, respectively. These inputs are also sampled (306), buffered and recorded in memory.

Figure 4B:
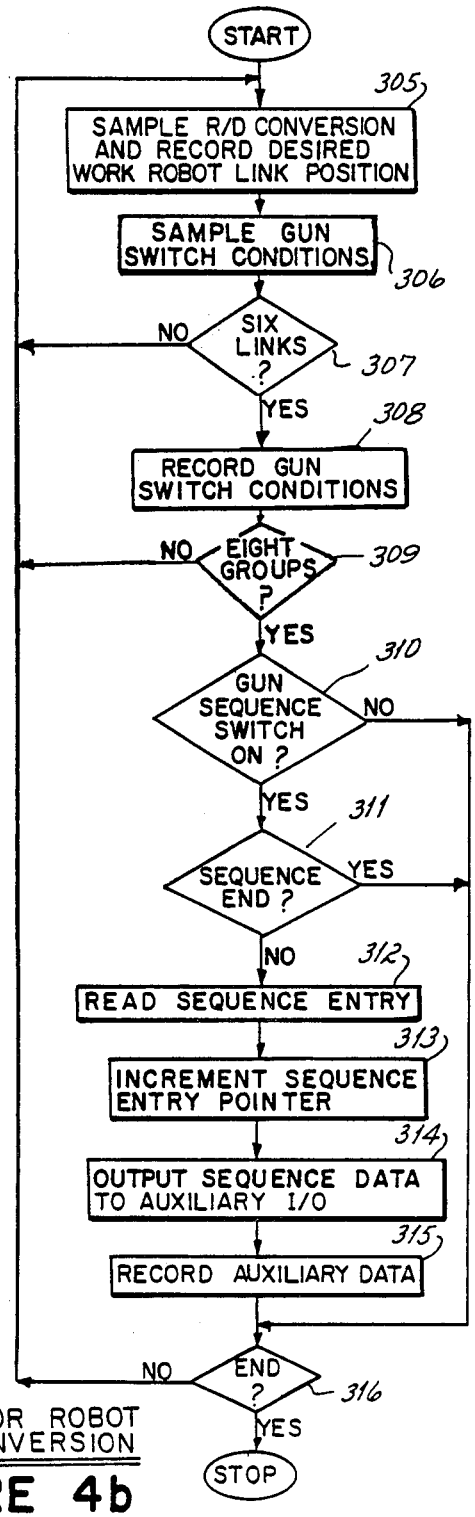

As shown in the flow chart of FIG. 4b, after the recording of position commands for each of the six links of the simulator robot (307), the OFF/ON/FAN and electrostatic switch conditions are recorded (308). In practice, the gun switch conditions are sampled each time a link position command is recorded. Thereafter, when the gun switch conditions are recorded, there is also recorded an indication of the point during axis command recording at which a gun switch condition changed. This increased frequency of gun switch sampling is done to improve the resolution of gun switch control during program execution. Six axis commands and a related set of gun commands may be regarded as a "group" of commands. The controller loops through the recording of eight groups of commands (309) before checking for auxiliary commands. After recording eight groups of commands, the controller checks to determine if the gun sequence switch 158$i$ is on (310). If not, the controller cycles through another eight groups of link and gun switch commands for storage in the robot program memory. The reduced frequency of recording auxiliary function commands, relative to the frequency of recording groups of axis and gun commands, is used to conserve program memory space since the resolution required for execution of the auxiliary functions is relatively less than that required for the other functions.

If the operator has activated the gun sequence switch, the controller checks to determine if the final set of auxiliary function commands have already been written (311) from the auxiliary memory 407. If it has, the controller ignores the activation of the gun sequence switch and returns to the beginning of the routine. If the controller has not yet reached the end of the sequence of auxiliary function commands in the auxiliary memory 407, the controller reads the next set of auxiliary function commands in the sequence (312) from the auxiliary memory 407. Then the controller increments the sequence entry pointer (313) to the next set of auxiliary function commands in the sequence.

Since the controller checks the condition of the sequence switch 158$i$ after each eight groups of link position commands, the auxiliary function command or commands read by the controller when the sequence switch is activated are read in timed relationship to the movement of the simulator by the operator.

In order to produce a painting program, the operator of the simulator robot not only moves the simulator to produce a sequence of link position commands, but also actually spray paints a work piece. In this way, the simulator operator can determine during the simulation that the spray painting pattern produced has satisfactorily painted the work piece. During a training session, the simulator operator moves the gun and operates the gun switches and the activation of the gun switches is effective to control the functions of the gun. In like manner, in order to properly record a complete command sequence, the auxiliary functions read from the auxiliary function memory when the operator depresses the sequence switch 158$i$ are performed in timed relationship to the movement of the gun during the training session.

Therefore, after the controller has read a set of auxiliary function commands in sequence from the auxiliary memory, the controller then executes the auxiliary commands. If the auxiliary function to be executed is an auxiliary output, the controller issues a command to the appropriate output device to perform the auxiliary function (314). If the auxiliary function is an auxiliary input, the controller reads the condition of the input line from the auxiliary input device (315). If the auxiliary function is a delay, the controller pauses in the recording of link position commands and gun commands until the end of the delay interval.

After the execution of an auxiliary function, the controller then stores, in the robot program memory, the associated auxiliary function command interleaved with the link position commands at the point in the sequence of link position commands where the sequence switch was activated by the operator. Consequently, by preloading the auxiliary function commands in the auxiliary memory 407, the operator needs merely to operate a single sequence switch 158i at the simulator robot gun 158 to both execute and store each auxiliary function at the proper point in the sequence of link position commands. The controller continues to loop through the routine illustrated in FIG. 4b until the operator again activates the program switch 158h, ending the programming routine (316).

In storing the program to be executed by the work robot, the controller stores "instructions" which each include eight groups of commands. Each of these groups of commands includes six link position commands, an OFF/ON/FAN switch condition signal, and an electrostatic switch condition signal. Each instruction may also include a set of auxiliary function commands. The sequence of instructions forms the complete program for the work robot.

Figure 3:
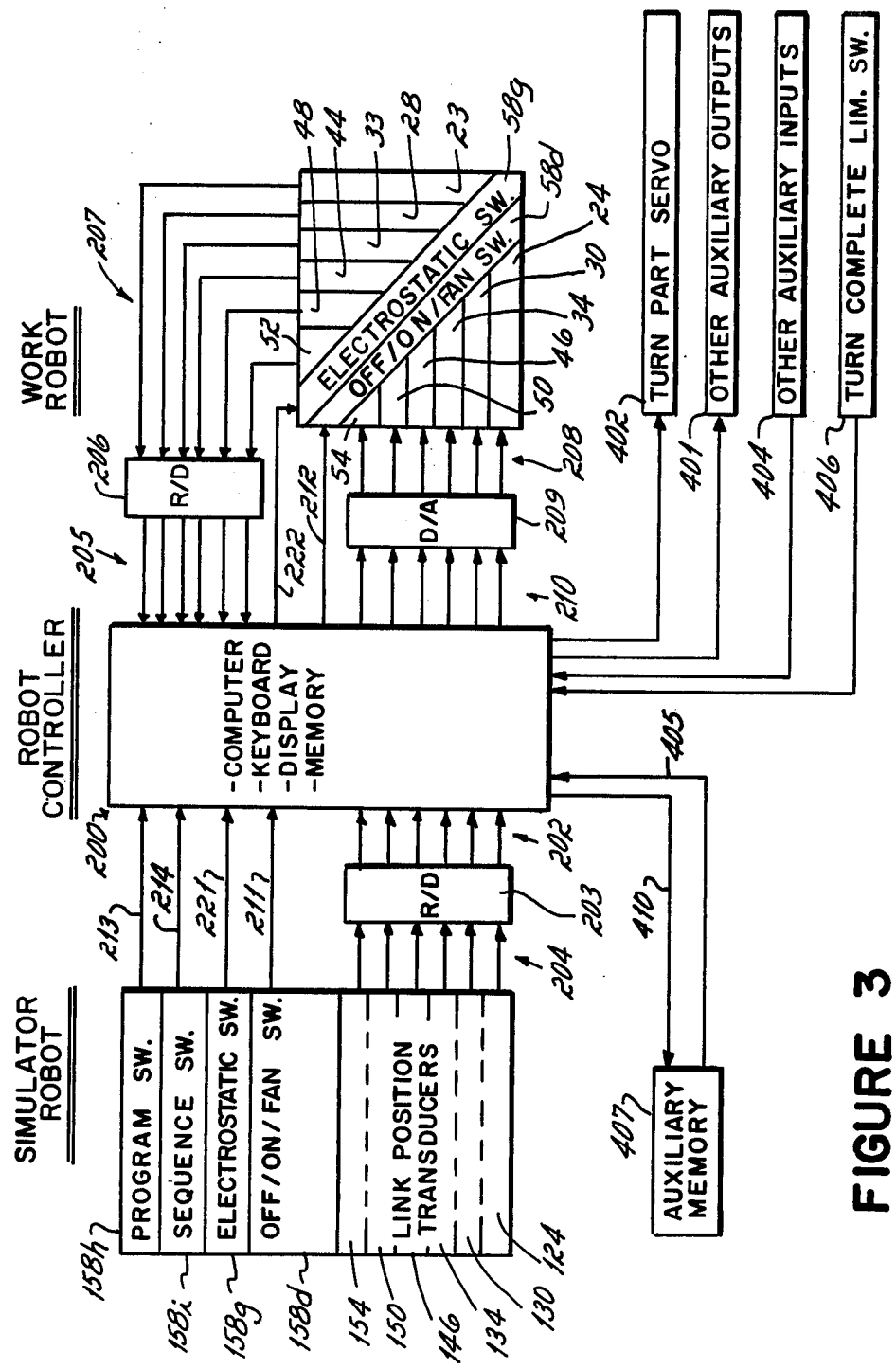
FIG. 3 is a circuit diagram in block format of a preferred embodiment of the invention.

As an example of the reading, execution and storage of auxiliary function commands, a flat panel work piece 403 to be painted is rotatable by a servo motor 402 and has an associated position-indicating limit switch 406 as shown in FIG. 5. The panel 403 is positioned to be spray painted by the simulator robot gun 158. The gun, servo motor, and limit switch are coupled to the robot controller as illustrated in FIG. 3.

In the course of producing a spray painting program in a training session, the operator of the simulator must spray paint one side of the panel 403, wait while the panel is rotated 180°, and then spray paint the other side of the panel. Painting the two sides of the panel constitutes a complete spray painting program. Prior to the training session, the operator loads the auxiliary function memory 407 with the necessary auxiliary function commands in the order in which they are to be read, executed and stored during the training session.

If there are other auxiliary function commands to be executed during the training session, in addition to those associated with turning the panel 403, the commands for turning the panel must be properly located in the sequence of auxiliary function commands so that those auxiliary functions needed before the part is turned are read from the auxiliary function memory first, and those auxiliary function commands needed after the panel has been turned are stored in the auxiliary function memory after the auxiliary function commands for turning the panel. In the present example, assuming that the auxiliary function commands associated with turning the panel 403 are the only auxiliary function commands to be executed, the first storage location in the auxiliary function memory is loaded with a "turn part" command. This is an auxiliary output function command which, when executed, activates the servo motor 402 to rotate the panel 180°. In the next memory location in the auxiliary function memory, two auxiliary function commands are stored. The first is a delay command. When this command is executed, the robot controller stops recording link position commands for the specified delay interval. In the present example, the delay interval is five seconds. If the execution of the painting program is synchronized with movement of the panel on a conveyor, the five second delay may be considered to be a five second delay at nominal conveyor speed. In this case the delay will vary with the actual conveyor speed during execution of the painting program. At the same auxiliary function memory location, there is also stored an auxiliary input function command, which when executed directs the controller to read the condition of the limit switch 406. The limit switch is activated after the panel 403 has been rotated through 180°. The controller is operable to execute a delay command prior to executing an auxiliary input command, when they are stored at the same auxiliary function memory location, so the delay is implemented before the condition of the limit switch 406 is read by the controller.

After the requisite auxiliary function commands are stored in the auxiliary function memory 407, the simulator operator begins the training session by depressing the program switch 158h. In the course of spray painting the panel 403, the simulator operator, after satisfactorily spray painting one side of the panel, depresses the sequence switch 158i and the controller reads the "turn part" auxiliary function command from the auxiliary function memory. The controller outputs the command to the servo motor 402 to turn the work piece. The controller also records the "turn part" command in the sequence of link position commands and gun commands, at a point in the link command sequence corresponding to the point in the link command sequence at which the operator depresses the sequence switch 158i.

When the operator depresses the sequence switch 158i to effect the turning of the panel 403, the operator also turns off the paint spray using the gun trigger switch 158d. The operator must now wait for the panel 403 to be rotated through 180° before beginning to spray paint the other side of the panel. In order to conserve space in the robot program memory, it is desirable not to record the link positions during the delay interval for the rotation of the panel. Therefore, the simulator operator again depresses the sequence switch 158i. In response to this second activation of the sequence switch, the controller reads the auxiliary function commands at the second storage location in the auxiliary function memory. These commands are the five second delay and the auxiliary input command to read the condition of the limit switch 406.

The controller first executes the delay command, by ceasing to record link position commands and gun commands for the duration of the delay interval of five seconds. After the expiration of the five second delay, the controller then responds to the auxiliary input command to check the condition of the limit switch 406. If for some reason the limit switch has not been activated, indicating that the panel 403 has not reached its proper position within the five second delay interval, the controller aborts the training session and provides some type of audible and/or visible alarm to the simulator operator.

If the limit switch 406 has been properly activated, indicating that the panel 403 has been rotated through 180°, the controller resumes recording link position commands, gun commands and auxiliary function commands. The simulator operator then proceeds to spray paint the second side of the panel 403, to complete the spray painting program for the panel. When the operator has completed spray painting the panel, the operator depresses the program switch 158h, which ends the recording of commands by the controller and terminates the training session.

Following reading, reformatting if necessary, and storage in the robot program memory of the program of commands, the work robot drive phase, or program execution or replay, may be initiated, as shown in the flow chart of FIG. 4c. The steps shown in the flow chart are sequentially repeated, at the controller command position processing rate. Considering only a single instruction, the robot controller program execution shall now be described. The desired gun switch conditions of a first group of commands are retrieved (317) from the robot controller memory and transferred to the gun switches (318) of the work robot via lines 212, 222. The timing of the application of a gun command to a gun switch is correlated to the recorded indication of the point during axis command recording that the gun switch condition changed.

Next the desired work robot link position for the first link of a group is retrieved from the robot controller memory (319). The actual position of the work robot link in question is input via its respective line 207 and R/D converter 206 to the robot controller buffer register (320), and the desired and actual work robot link positions are then compared and a work robot link position error for that particular link is computed by the robot controller (321). The work robot link position error signal is output via its respective line 210 to its respective work robot link actuator (322) via D/A converter 209 to position the work robot link.

These steps are repeated for each of the six desired work robot link position signals in a group of commands (323). When all desired work robot link position signals in the group have been processed in the manner indicated, the controller determines if eight groups of commands have been executed (324). The controller loops through the execution of commands, as described, if eight groups of commands have not been executed. After the execution of eight groups of commands, the controller then retrieves any auxiliary data which might be present in the instruction from the controller memory (325), outputs the auxiliary data to the auxiliary output devices and, if commanded, executes any delays and reads any necessary auxiliary inputs (326). This completes the execution of the robot controller program for a single instruction of link position, gun switch and auxiliary function commands. The foregoing steps, illustrated in the flow chart of FIG. 4c, are repeated for each instruction until all instructions have been input to the work robot to drive it through the desired sequence of motions which were programmed with the simulator robot at the workpiece site and stored in the controller memory during the program recording phase. When this has occurred, the program terminates (327).

Operation of the robot controller 200 at all times is under control of main, or supervisory, programs which, in addition to controlling, recording and executing a sequence of desired link positions stored in memory, are also operative to facilitate such things as: turn-on and turn-off of the entire robot system when an appropriate POWER ON/OFF switch (not shown) is activated, continuous monitoring of hydraulic pressure levels in all work robot link actuators, orderly interruption of execution of the stored sequence of link positions by the work robot when a STOP button (not shown) is actuated, control of the orderly flow of data between the various components of the controller and/or between the work and simulator robots and the controller, effecting various diagnostic, interlock and safety routines, etc. The main or supervisory programs are interrupted, as necessary, to accomplish the routines and subroutines shown in FIG. 4.

What is claimed is:
1. A control system for a work robot comprising:
a controller for concurrently (a) driving at least one articulated robot link under closed loop servo control and (b) executing at least one auxiliary function operating in conjunction with the robot link, in response to a sequence of link position commands and auxiliary function commands read from a robot program memory;
an auxiliary function memory, associated with the controller, for temporarily storing auxiliary function commands;
means for loading the auxiliary function memory with auxiliary function commands, prior to storing a sequence of link position commands and auxiliary function commands in the robot program memory, so that the auxiliary function commands can be read from the auxiliary function memory in a desired order;
a robot simulator manually manipulable to produce a sequence of robot link position commands;
manually operated auxiliary function command sequencing means for effecting the reading of each auxiliary function command, in order, from the auxiliary function memory at a point in the sequence of robot link position commands correlated to the point during the sequence of robot link position commands at which the sequencing means is manually operated; and
memory means in the controller, coupled to the robot simulator and to the auxiliary function memory, including a robot program memory for storing the sequence of link position commands produced by the simulator interleaved with the auxiliary function commands read from the auxiliary function memory, each auxiliary function command being stored at a point in the sequence of robot link position commands correlated to the point in the sequence of robot link position commands at which the auxiliary function command sequencing means is manually operated.

2. The control system of claim 1 which further comprises means for implementing each auxiliary function command as it is read from the auxiliary function memory for storage in the robot program memory.

3. The control system of claim 2 which further comprises an auxiliary output device not associated with the robot link and in which the means for implementing auxiliary function commands includes means for providing an auxiliary output command to the auxiliary output device to activate the device.

4. The control system of claim 2 which further comprises an auxiliary input device not associated with the robot link and in which the means for implementing auxiliary function commands includes means for reading the condition of the auxiliary input device in response to an auxiliary input function command read from the robot program memory.

5. The control system of claim 3 which further comprises an auxiliary input device not associated with the robot link and in which the means for implementing auxiliary function commands includes means for reading the condition of the auxiliary input device in response to an auxiliary input function command read from the robot program memory.

6. The control system of claim 5 in which the controller drives a plurality of articulated robot links, which comprise a work robot, under closed loop servo control for movement relative to a work piece, and the auxiliary output device includes means for varying the orientation of the work piece relative to the work robot.

7. A control system for a work robot which includes a spray coating gun for applying a spray coating to a work piece comprising:
a controller for concurrently (a) driving at least one articulated robot link under closed loop servo control, (b) executing at least one spray gun command in conjunction with the robot link, and (c) executing at least one auxiliary function operating in conjunction with the robot link, in response to a sequence of link position commands, gun commands, and auxiliary function commands read from a robot program memory;
an auxiliary function memory, associated with the controller, for temporarily storing auxiliary function commands;
means for loading the auxiliary function memory with auxiliary function commands, prior to storing a sequence of link position commands and auxiliary function commands in the robot program memory, so that the auxiliary function commands can be read from the auxiliary function memory in a desired order;
a robot simulator manually manipulable to produce a sequence of robot link position commands;
a robot simulator spray gun manually operable to produce gun commands for controlling the flow of coating material from the gun;
manually operated auxiliary function command sequencing means for effecting the reading of each auxiliary function command, in order, from the auxiliary function memory at a point in the sequence of robot link position commands correlated to the point during the sequence of robot link position commands at which the sequencing means is manually operated; and
memory means in the controller, coupled to the robot simulator, the simulator spray gun, and the auxiliary function memory, including a robot program memory for storing the sequence of link position commands produced by the simulator interleaved with the gun commands and the auxiliary function commands read from the auxiliary function memory, each auxiliary function command being stored at a point in the sequence of robot link position commands correlated to the point in the sequence of robot link position commands at which the auxiliary function command sequencing means is manually operated.

8. The control system of claim 7 which further comprises means for implementing each auxiliary function command as it is read from the auxiliary function memory for storage in the robot program memory.

9. The control system of claim 8 which further comprises an auxiliary output device not associated with the robot link and in which the means for implementing auxiliary function commands includes means for providing an auxiliary output command to the auxiliary output device to activate the device.

10. The control system of claim 8 which further comprises an auxiliary input device not associated with the robot link and in which the means for implementing auxiliary function commands includes means for reading the condition of the auxiliary input device in response to an auxiliary input function command read from the robot program memory.

11. The control system of claim 9 which further comprises an auxiliary input device not associated with the robot link and in which the means for implementing auxiliary function commands includes means for reading the condition of the auxiliary input device in response to an auxiliary input function command read from the robot program memory.

12. The control system of claim 11 in which the controller drives a plurality of articulated robot links, which comprise a work robot, under closed loop servo control for movement relative to a work piece, and the auxiliary output device includes means for varying the orientation of the work piece relative to the work robot.

13. A control system for a work robot comprising:
a controller for concurrently (a) driving at least one articulated robot link under closed loop servo control and (b) executing at least one auxiliary function operating in conjunction with the robot link, in response to a sequence of link position commands and auxiliary function commands read from a robot program memory;
an auxiliary function memory, associated with the controller, for temporarily storing auxiliary function commands;
means for loading the auxiliary function memory with auxiliary function commands, prior to storing a sequence of link position commands and auxiliary function commands in the robot program memory, so that the auxiliary function commands can be read from the auxiliary function memory in a desired order;
means for producing a sequence of robot link position commands;
manually operated auxiliary function command sequencing means for effecting the reading of each auxiliary function command, in order, from the auxiliary function memory at a point in the sequence of robot link position commands correlated to the point during the sequence of robot link position commands at which the sequencing means is manually operated; and
memory means in the controller, coupled to the means for producing link position commands and to the auxiliary function memory, simulator and to the auxiliary function memory, including a robot program memory for storing the sequence of link position commands produced by the simulator interleaved with the auxiliary function commands read from the auxiliary function memory, each auxiliary function command being stored at a point in the sequence of robot link position commands correlated to the point in the sequence of robot link position commands at which the auxiliary function command sequencing means is manually operated.

14. The control system of claim 13 which further comprises means for implementing each auxiliary function command as it is read from the auxiliary function memory for storage in the robot program memory.

15. The control system of claim 14 which further comprises an auxiliary output device not associated with the robot link and in which the means for implementing auxiliary function commands includes means for providing an auxiliary output command to the auxiliary output device to activate the device.

16. The control system of claim 14 which further comprises an auxiliary input device not associated with the robot link and in which the means for implementing auxiliary function commands includes means for reading the condition of the auxiliary input device in response to an auxiliary input function command read from the robot program memory.

17. The control system of claim 15 which further comprises an auxiliary input device not associated with the robot link and in which the means for implementing auxiliary function commands includes means for reading the condition of the auxiliary input device in response to an auxiliary input function command read from the robot program memory.

18. The control system of claim 17 in which the controller drives a plurality of articulated robot links, which comprise a work robot, under closed loop servo control for movement relative to a work piece, and the auxiliary output device includes means for varying the orientation of the work piece relative to the work robot.

19. A control system for a work robot which includes a spray coating gun for applying a spray coating to a work piece comprising:
   a controller for concurrently (a) driving at least one articulated robot link under closed loop servo control, (b) executing at least one spray gun command in conjunction with the robot link, and (c) executing at least one auxiliary function operating in conjunction with the robot link, in response to a sequence of link position commands, gun commands, and auxiliary function commands read from a robot program memory;
   an auxiliary function memory, associated with the controller, for temporarily storing auxiliary function commands;
   means for loading the auxiliary function memory with auxiliary function commands, prior to storing a sequence of link position commands and auxiliary function commands in the robot program memory, so that the auxiliary function commands can be read from the auxiliary function memory in a desired order;
   means for producing a sequence of robot link position commands;
   a robot simulator spray gun manually operable to produce gun commands for controlling the flow of coating material from the gun;
   manually operated auxiliary function command sequencing means for effecting the reading of each auxiliary function command, in order, from the auxiliary function memory at a point in the sequence of robot link position commands correlated to the point during the sequence of robot link position commands at which the sequencing means is manually operated; and
   memory means in the controller, coupled to the means for producing a sequence of robot link position commands, the simulator spray gun, and the auxiliary function memory, including a robot program memory for storing the sequence of link position commands produced by the simulator interleaved with the gun commands and the auxiliary function commands read from the auxiliary function memory, each auxiliary function command being stored at a point in the sequence of robot link position commands correlated to the point in the sequence of robot link position commands at which the auxiliary function command sequencing means is manually operated.

20. The control system of claim 19 which further comprises means for implementing each auxiliary function command as it is read from the auxiliary function memory for storage in the robot program memory.

21. The control system of claim 20 which further comprises an auxiliary output device not associated with the robot link and in which the means for implementing auxiliary function commands includes means for providing an auxiliary output command to the auxiliary output device to activate the device.

22. The control system of claim 20 which further comprises an auxiliary input device not associated with the robot link and in which the means for implementing auxiliary function commands includes means for reading the condition of the auxiliary input device in response to an auxiliary input function command read from the robot program memory.

23. The control system of claim 21 which further comprises an auxiliary input device not associated with the robot link and in which the means for implementing auxiliary function commands includes means for reading the condition of the auxiliary input device in response to an auxiliary input function command read from the robot program memory.

24. The control system of claim 23 in which the controller drives a plurality of articulated robot links, which comprise a work robot, under closed loop servo control for movement relative to a work piece, and the auxiliary output device includes means for varying the orientation of the work piece relative to the work robot.

25. A method of storing a program for concurrently (a) driving a work robot having at least one articulated link under closed loop servo control and (b) executing at least one auxiliary function not related to the robot link, in which the program is made up of a sequence of link position commands interleaved with auxiliary function commands, comprising the steps of:
   loading an auxiliary function memory with auxiliary function commands so that the commands can be read from the auxiliary function memory in a desired order;
   producing a sequence of robot link position commands;
   reading each auxiliary function command from the auxiliary function memory, in sequence, during the production of the robot link position commands; and
   storing the sequence of link position commands interleaved with the auxiliary function commands read from the auxiliary function memory, with each auxiliary function command being stored at a point in the sequence of link position commands correlated to the point in the link position command sequence at which the auxiliary function command is read from the auxiliary function memory.

26. The method of claim 25 which includes the additional step, after the step of reading each auxiliary function command from the auxiliary function memory, of executing the auxiliary function called for by each auxiliary function command.

27. A method of storing a program for concurrently (a) driving a work robot having at least one articulated link under closed loop servo control and (b) executing at least one auxiliary function not related to the robot link in which the program is made up of a sequence of link position commands interleaved with auxiliary function commands, comprising the steps of:

loading an auxiliary function memory with auxiliary function commands so that the commands can subsequently be read from the auxiliary function memory during a training session in a desired order;

manually manipulating a robot simulator during the training session to produce a sequence of robot link position commands;

manually operating an auxiliary function command sequence switch for effecting the reading of each auxiliary function command, in order, from the auxiliary function memory during the training session; and storing the sequence of link position commands produced by the manipulation of the robot simulator interleaved with the auxiliary function commands read from the auxiliary function memory, with each auxiliary function command being stored at a point in the sequence of link position commands correlated to the point in the link command sequence at which the sequence switch is manually operated.

28. The method of claim 27 which includes the additional step, after the step of manually operating the auxiliary function command sequence switch, of executing the auxiliary function called for by each auxiliary function command read from the auxiliary function memory, the point in the sequence of link position commands at which the auxiliary function is executed being correlated to the point in the link command sequence at which the auxiliary function command sequence switch is manually operated.

29. A method of storing a program for concurrently (a) driving a work robot having a plurality of articulated links under closed loop servo control to perform work upon a work piece and (b) executing a number of auxiliary functions not related to the articulated robot links, in which the program is made up of a sequence of link position commands used to control the articulated robot links interleaved with auxiliary function commands used to control the execution of the auxiliary functions, comprising the steps of:

loading an auxiliary function memory with auxiliary function commands so that the commands can be read from the auxiliary function memory in a desired order during a training session in which the work robot program is stored;

manually manipulating a robot simulator made up of a plurality of articulated links corresponding to those of the work robot to produce a sequence of robot link position commands during a training session;

manually operating an auxiliary function command sequence switch during the training session to effect the reading of each auxiliary function command, in order, from the auxiliary function memory;

executing the auxiliary function called for by each auxiliary function command read from the auxiliary function memory at a point in the sequence of link position commands correlated to the point in the link command sequence at which the sequence switch is manually operated; and storing the sequence of link position commands produced by the simulator interleaved with the auxiliary function commands read from the auxiliary function memory to thereby store a program for the work robot, each auxiliary function command being stored at a point in the link position command sequence correlated to the point in the link command sequence at which the sequence switch was manually operated.

30. The method of claim 29 in which the step of executing the auxiliary function called for by each auxiliary function command read from the auxiliary function memory comprises reading the condition of an auxiliary input from an auxiliary input device associated with the work piece operated upon by the work robot.

31. The method of claim 29 in which the step of executing the auxiliary function called for by each auxiliary function command read from the auxiliary function memory comprises producing an auxiliary function output signal for activating an auxiliary output device associated with the work robot and the work piece.

32. The method of claim 31 in which the step of executing the auxiliary function called for by each auxiliary function command written from the auxiliary function memory comprises producing an auxiliary function output signal for actuating an auxiliary output device to alter the orientation of the work piece relative to the work robot.

* * * * *